United States Patent
Prior et al.

(10) Patent No.: US 8,413,434 B2
(45) Date of Patent: Apr. 9, 2013

(54) EXHAUST HEAT RECOVERY FOR TRANSMISSION WARM-UP

(75) Inventors: Gregory P. Prior, Birmingham, MI (US); George M. Claypole, Fenton, MI (US); Daniel B. Glassford, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 470 days.

(21) Appl. No.: 12/582,727

(22) Filed: Oct. 21, 2009

(65) Prior Publication Data

US 2011/0088378 A1    Apr. 21, 2011

(51) Int. Cl.
| F01N 5/00 | (2006.01) |
| F25B 29/00 | (2006.01) |
| G05D 16/00 | (2006.01) |
| F01M 5/00 | (2006.01) |

(52) U.S. Cl. .......... 60/320; 165/266; 165/296; 165/297; 184/6.22; 184/104.1

(58) Field of Classification Search ............ 60/273, 60/288, 289, 298, 300, 320; 475/117; 477/98; 123/41.29, 41.31, 41.33, 142.5 R, 196 AB; 165/266, 296, 297; 184/6.12, 6.22, 104.1, 184/104.2

See application file for complete search history.

(56) References Cited

U.S. PATENT DOCUMENTS

| 6,427,640 | B1 * | 8/2002 | Hickey et al. ............... 123/41.31 |
| 7,318,396 | B1 * | 1/2008 | Belter et al. ................. 123/41.8 |
| 2004/0144084 | A1 * | 7/2004 | Hara ............................... 60/288 |
| 2005/0178348 | A1 * | 8/2005 | Werner et al. .............. 123/41.33 |
| 2007/0137594 | A1 * | 6/2007 | Boudard et al. ........... 123/41.57 |
| 2008/0223317 | A1 | 9/2008 | Shintani et al. |
| 2009/0308059 | A1 * | 12/2009 | Ikemoto ......................... 60/287 |
| 2011/0005477 | A1 * | 1/2011 | Terashima et al. ......... 123/41.51 |

FOREIGN PATENT DOCUMENTS

| DE | 102008008491 A1 | 8/2009 |
| WO | 2004042310 A1 | 5/2004 |

OTHER PUBLICATIONS

Machine translation of WO2004/042310A1.*

* cited by examiner

*Primary Examiner* — Kenneth Bomberg
*Assistant Examiner* — Jason Sheppard
(74) *Attorney, Agent, or Firm* — Quinn Law Group, PLLC

(57) ABSTRACT

An exhaust heat recovery system (EHRS) for a vehicle is provided that is operable to direct coolant heated by exhaust heat to a vehicle transmission under certain operating conditions after the engine is adequately heated by the exhaust heat and without further heating the engine with the exhaust heat. Thus, recovery of exhaust heat is increased as the transmission is heated to a higher operating temperature than the engine using the heated coolant. The EHRS may also operate in a bypass mode during which exhaust heat is not directed to the engine or the transmission. A method of managing exhaust heat is also provided.

9 Claims, 6 Drawing Sheets

EXHAUST HEAT RECOVERY FOR TRANSMISSION WARM-UP

TECHNICAL FIELD

The invention relates to an exhaust heat recovery system for a vehicle, and a method of managing exhaust heat.

BACKGROUND OF THE INVENTION

Rapid warm-up of engine coolant, engine oil, and transmission fluid can improve fuel economy during a cold start (i.e., when the vehicle has not been running and the engine and transmission are relatively cold). Engine warm-up is especially challenging for diesel and hybrid applications, as less fuel is burned. Optimal operating temperatures for the engine and the transmission may be different.

SUMMARY OF THE INVENTION

An exhaust heat recovery system (EHRS) for a vehicle is provided that is operable to direct coolant heated by exhaust heat to a vehicle transmission under certain operating conditions after the engine is adequately heated by the exhaust heat and without further heating the engine with the exhaust heat. Thus, recovery of exhaust heat is increased as the transmission is heated using a higher operating coolant temperature than the engine coolant. The EHRS can also operate in a bypass mode during which exhaust heat is not directed to the engine or the transmission.

An exhaust heat recovery system (EHRS) is provided for a vehicle that has an engine, a transmission with a transmission heat exchanger, and an exhaust system through which exhaust gas is discharged from the engine. The EHRS includes an exhaust heat recovery device that is positioned in the exhaust system and that has an exhaust heat recovery device heat exchanger (EHRDHE) and a bypass valve. The bypass valve is operable in a first position to direct exhaust gas through the EHRDHE and in a second position to bypass the EHRDHE. The EHRS includes a plurality of coolant flow passages defining a first circuit directing coolant flow from the EHRDHE to the engine, a second circuit directing coolant flow to the engine and that bypasses the EHRDHE, and a third circuit that directs coolant flow from the EHRDHE to the transmission heat exchanger. Coolant temperature sensors are operable to sense temperature of the coolant in the circuits. At least one valve is operable to direct coolant flow to the first circuit when coolant temperature in the first circuit is less than a first predetermined temperature, to thereby warm the engine using the exhaust heat, and to direct coolant flow to the second circuit when coolant temperature of the engine is greater than the first predetermined temperature. Thus, the engine is only warmed to the first predetermined temperature using heat from the EHRDHE. A pump is positioned in the third circuit and is controllable to pump the coolant when the coolant temperature in the third circuit is less than a second predetermined temperature. The second predetermined temperature is greater than the first predetermined temperature so that the transmission is warmed further by the exhaust heat after warming of the engine is complete. In some embodiments, the first predetermined temperature may be about 80 degrees Celsius and the second predetermined temperature may be about 122 degrees Celsius. In other embodiments, both the engine and the transmission are heated after coolant temperature through the engine reaches a third predetermined temperature less than the first predetermined temperature until temperature of coolant flow in the engine is at the first predetermined temperature, at which time only coolant flow to the transmission is heated further to the second predetermined temperature. For example, after coolant flow through the engine reaches 80 degrees Celsius (the third predetermined temperature), both the engine and the transmission are heated until coolant flow through the engine reaches 90 degrees Celsius (the first predetermined temperature). Then the at least one valve directs coolant flow from the EHRDHE only to the transmission, until the coolant flow reaches about 122 degrees Celsius (the second predetermined temperature), after which no coolant is heated by the EHRDHE.

A method of managing exhaust heat recovery on a vehicle includes controlling a bypass valve for an exhaust heat recovery device heat exchanger, a coolant pump and one or more coolant flow valves to control heating of coolant in multiple coolant flow circuits in response to sensed coolant temperature. The multiple coolant flow circuits include a first coolant flow circuit in fluid communication with the EHRDHE and with the engine and not in substantial fluid communication with the transmission heat exchanger, a second coolant flow circuit in fluid communication with the engine and not in substantial fluid communication with the EHRDHE, and a third coolant flow circuit in fluid communication with the EHRDHE and with the transmission heat exchanger and not in substantial fluid communication with the engine. The bypass valve, the coolant pump and one or more coolant flow valves are controlled so that the transmission is heated via exhaust heat and coolant flow in the third coolant flow circuit to a higher temperature than the engine after the engine is heated via exhaust heat and coolant flow in the first coolant flow circuit, with coolant flow to the engine being via the second coolant flow circuit when the transmission is heated via coolant flow in the third coolant flow circuit.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
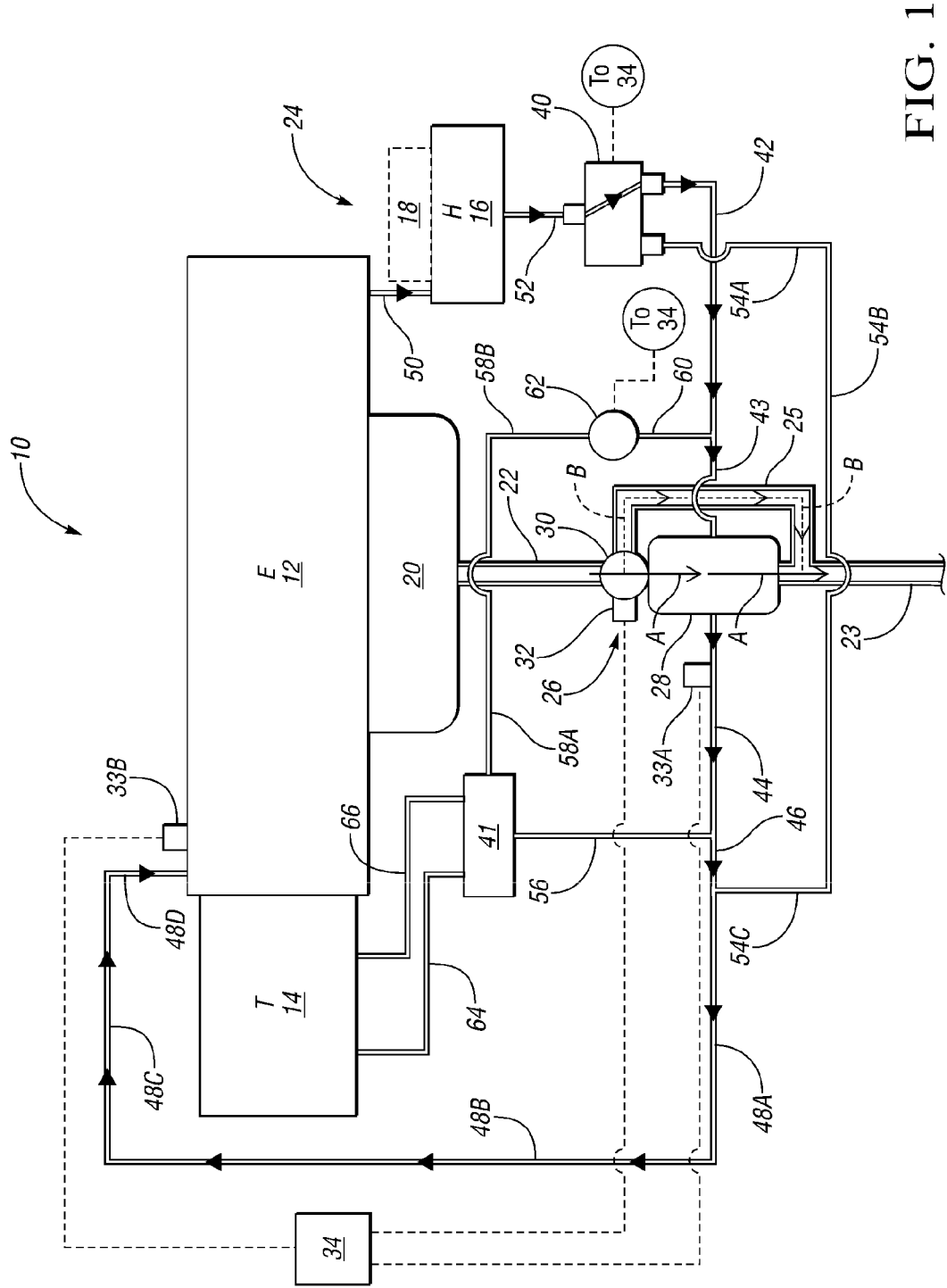
FIG. 1 is a schematic illustration of a first embodiment of a vehicle with a first embodiment of an EHRS operating in an engine warm-up mode.

Referring to the drawings, wherein like reference numbers refer to like components throughout the several views, FIG. 1 shows a vehicle 10 that has an engine 12 (labeled E) for propelling the vehicle 10, a transmission 14 (labeled T) operatively connected to the engine 12, and a passenger compartment heater 16 (labeled H) for heating a passenger compartment, indicated in phantom as 18. The vehicle 10 may be a hybrid vehicle having one or more motor/generators operatively connected to the transmission to provide tractive power in various operating modes, as is known.

The engine 10 is an internal combustion engine of the gasoline or diesel type, and generates exhaust gas in an exhaust system that includes an exhaust manifold 20 and an exhaust pipe 22 extending therefrom. The exhaust gas, which is relatively hot, exits the manifold 20 via the exhaust pipe 22. An exhaust heat recovery system (EHRS) 24 is provided in order to selectively capture some of the exhaust heat for providing heat to the engine 12, the passenger compartment 18 and the transmission 14. A catalytic converter (not shown) may be positioned between manifold 20 and the EHRS 24. The EHRS 24 includes an exhaust heat recovery device (EHRD) 26 positioned in the exhaust system. Specifically, the EHRD 26 includes an exhaust heat recovery device heat exchanger (EHRDHE) 28, a valve 30, and an exhaust bypass actuator 32 controllable to selectively open the valve 30 to permit some of the exhaust gas in the exhaust pipe 22 to flow through the EHRDHE 28 to exhaust pipe 23. When the valve 30 is not open, the exhaust gas bypasses the EHRDHE 28, flowing from exhaust pipe 22 to exhaust pipe 25 and into exhaust pipe 23 to exit the vehicle 10 without adding any heat to the EHRDHE 28. An electronic controller 34 is operatively connected to the actuator 32, and controls the actuator 32 according to vehicle operating conditions received as input signals from various sensors placed on the vehicle 10, such as an exhaust heat recovery coolant temperature sensor 33A and an engine coolant temperature sensor 33B. The information received by the controller 34 is indicative of such operating conditions as temperature of coolant flowing through the engine 12 (indicated by engine coolant temperature sensor 33B) and temperature of coolant exiting the EHRDHE 28 (indicated by exhaust heat recovery coolant temperature sensor 33A). The sensors 33A, 33B may directly measure the operating conditions, or may provide information used in a predictive model that predicts or estimates these operating conditions. A person of ordinary skill in the art would readily understand the various ways to provide such information indicative of vehicle operating conditions to the controller 34, and would readily understand various algorithms that may be stored on the controller 34 to process the information.

Figure 2:
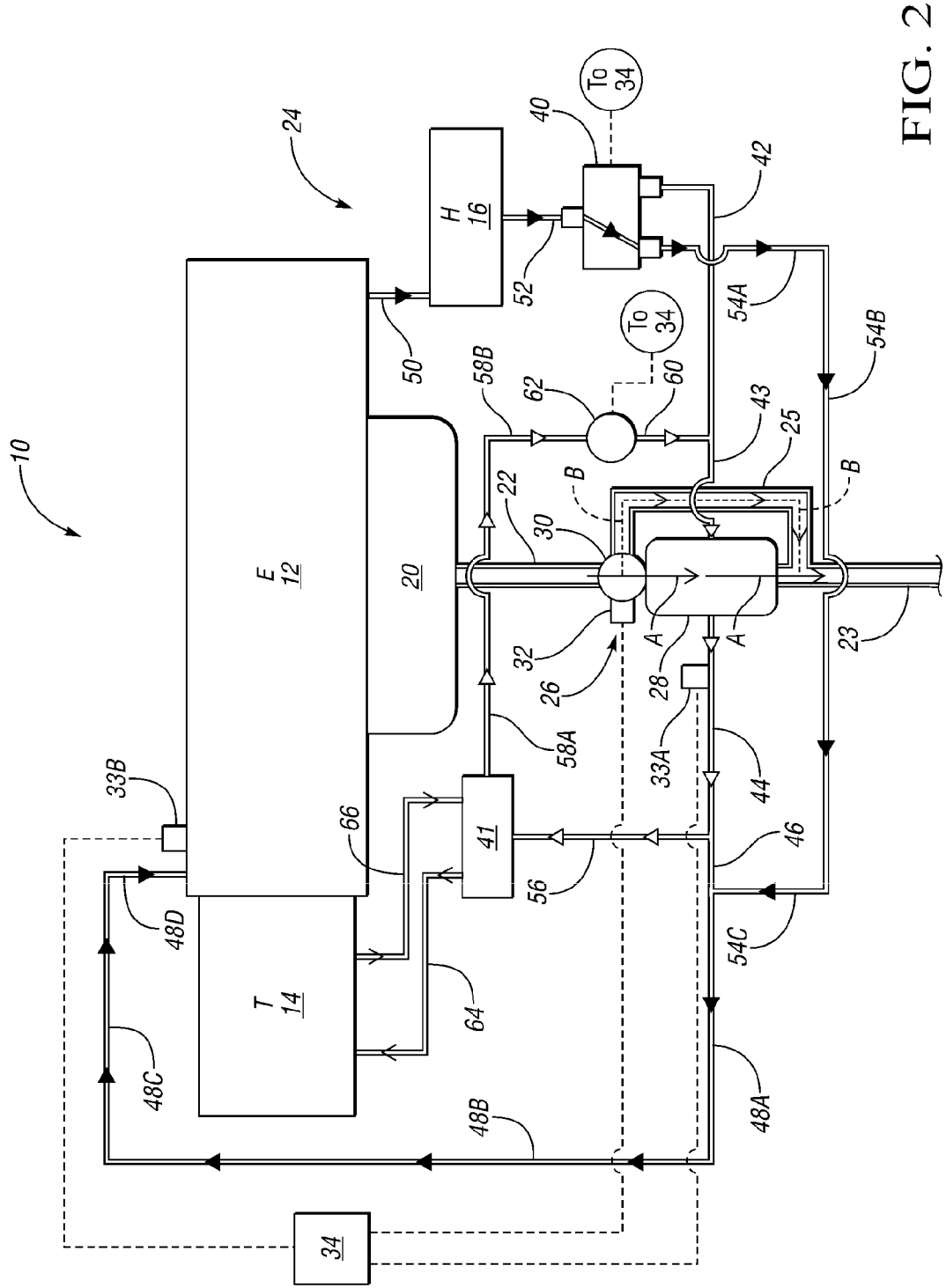
FIG. 2 is a schematic illustration of the vehicle of FIG. 1 with the EHRS operating in a transmission warm-up mode after engine warm-up is complete, and with a bypass mode shown in phantom.

As further described below, conduits filled with coolant are arranged to partially define three different coolant flow circuits to carry coolant from the EHRDHE 28 to the engine 12 and heater 16 and/or the transmission 14. The conduits may be flexible or rigid tubing, or bored, drilled, cast or otherwise formed passages in any vehicle component. A valve 40 is operatively connected to the controller 34 and is selectively positionable in response to a control signal received from the controller in a first position, shown in FIG. 1, and a second position, shown in FIG. 2, to direct coolant flow to the first or the second coolant flow circuit, respectively, as further explained below. The valve 40 may be a vacuum diaphragm-type valve, or a wax motor (in which case it might not be activated by the controller 34). For example a wax motor valve may be activated (i.e., start to open) by coolant flowing through it at a predetermined temperature.

Specifically, in the first coolant flow circuit, coolant flows from the EHRDHE 28 to the engine 12. In the first coolant flow circuit, coolant runs through conduit 42 from the valve 40 (which is in the first position of FIG. 1), to conduit 43 and through the EHRDHE 28, to conduit 44 extending from the EHRDHE 28, and conduits 46 and 48A, 48B, 48C and 48D, through coolant flow passages in the engine 12 and could be used for heating engine oil within the engine 12 according to any known heat transfer mechanisms, through conduit 50 extending from the engine 12 to the heater 16, and conduit 52 extending from the heater 16 to the valve 40. Coolant flow in the first coolant flow circuit is indicated by shaded arrowheads in FIG. 1. The engine 12 has a pump (not shown) that maintains coolant flow through the first circuit when the valve 40 is in the position of FIG. 1. The first coolant flow circuit is not in substantial fluid or thermal communication with the transmission heat exchanger 41. Although conduit 56 extends from the first coolant flow circuit to the transmission heat exchanger 41, coolant in conduit 56 is relatively still when coolant flows through the first circuit, as pump 62 is off.

A second coolant flow circuit directs coolant flow to the engine 12 and bypasses the EHRDHE 28. In the second coolant flow circuit, coolant runs through conduits 54A, 54B and 54C from the valve 40 (which is in the second position of FIG. 2), to conduits 48A, 48B, 48C and 48D, through coolant flow passages in the engine 12, through conduit 50 extending from the engine 12 to the heater 16, and conduit 52 extending from the heater 16 to the valve 40. Coolant flow in the second coolant flow circuit is indicated by arrowheads in FIG. 2. The engine 12 has a pump (not shown) that maintains coolant flow through the second circuit when the valve 40 is in the position of FIG. 2. The second coolant flow circuit is not in substantial fluid or thermal communication with the transmission heat exchanger 41. Although conduit 46 extends from a portion of the second coolant circuit, there is minimal if any coolant flow through conduit 46 whether or not pump 62 is on.

A third coolant flow circuit directs coolant flow from the EHRDHE 28 to the transmission heat exchanger 41. In the third coolant flow circuit, coolant runs from a pump 62 through conduit 60, to conduit 43 into the EHRDHE 28, to conduit 44, to conduit 56 into the transmission heat exchanger 41, to conduits 58A and 58B, and back through the pump 62. Coolant flow in the third coolant flow circuit is indicated in FIG. 1 by unshaded arrowheads. The pump 62 is positioned to pump coolant through the third circuit when powered on in response to a control signal received from the controller 34. While there may be some minimal heat transfer through coolant mixing between the third circuit and the second circuit via conduit 46, the majority of heated coolant is directed through the third circuit and remains flowing within the third circuit due to flow forces initiated by the pumping action of pump 62. The transmission 14 also has a pump (not shown), as is known, to maintain fluid flow between the heat exchanger 41 and transmission fluid within the transmission 14 through passages 64, 66, thereby transferring heat from heat exchanger 41 to the transmission 14. Thus, a separate coolant circuit is maintained between the heat exchanger 41, passages 64, 66 and the transmission 14 that draws heat from coolant in the third circuit via the heat exchanger 41. The third coolant flow circuit is not in substantial fluid or thermal communication with the engine 12.

By controlling valve 30, valve 40 (unless it is a wax motor valve) and pump 62, exhaust heat recovery is managed to heat the engine 12, heater 16, or the transmission 14 as desired in response to coolant temperatures sensed by sensors 33A and 33B. For example, an engine warm-up mode is established when the engine temperature sensor 33B indicates that coolant flow temperature through the engine 12 is less than or equal to a predetermined temperature, such as but not limited to 80 degrees Celsius. This mode may be appropriate during an engine cold start. The controller 34 sends a signal to position the valve 40 in the first position of FIG. 1, position the bypass valve 30 in a position to permit exhaust gas flow through the EHRDHE 28 as indicated by flow arrow A, and does not send a signal to start the pump 62 (i.e., pump 62 is off). Thus, coolant will flow through the first coolant flow circuit, with heat being transferred from the exhaust gas to the coolant via the EHRDHE 28, and transferred to the engine to heat the engine 12, and then to the heater 16.

After the engine 12 is appropriately warmed, the controller 34 establishes a transmission warm-up mode, in which exhaust heat is provided only to the transmission 14. For example, when the engine temperature sensor 33B indicates that coolant flow temperature through the engine 12 is greater than the predetermined temperature, the controller 34 will position the valve 40 in the second position of FIG. 2 so that coolant flow through the engine 12 is via the second coolant flow circuit and therefore is not heated via exhaust gas in the EHRDHE 28. If the EHRD coolant temperature sensor 33A indicates that coolant flowing from the EHRDHE 28 is greater than the first predetermined temperature and less than a second predetermined temperature, such as but not limited to 122 degrees Celsius, the controller 34 will maintain the bypass valve 30 in a position to direct exhaust gas through the EHRDHE 28, maintain valve 40 in the second position of FIG. 2, and turn pump 62 on so that coolant circulates through the third coolant flow circuit, drawing heat from the EHRDHE 28 which is then transferred to the transmission 14 through the transmission heat exchanger 41.

When the coolant temperature sensor 33A indicates that coolant flowing from the EHRDHE 28 is greater than the second predetermined temperature, the controller 34 will position the bypass valve 30 to direct exhaust gas from pipe 22 to pipe 25 and then to pipe 23, circumventing or bypassing the EHRDHE 28 in a bypass mode, as indicated in phantom by flow arrows B. The controller 34 will also turn pump 62 off under these conditions, so that no additional heat is transferred from the exhaust gas to the engine 12 or transmission 14.

Accordingly, the EHRS 24 prioritizes heat flow to the engine 12 and heater 16 when in warm-up mode, to the transmission 14 after the engine is warmed, and provides substantially no heat flow to the engine 12 or the transmission 14 when in bypass mode. During bypass mode, a minimal amount of heated coolant flow may exist through the EHRDHE 28 to the conduit 43 due to the proximity of the components, even with the valve 30 closed. Thus, the engine 12 is heated with a higher priority than the transmission 14 at lower temperatures, up to a predetermined temperature, while the transmission 14 is then heated to another, higher, predetermined temperature. The predetermined temperature to which the engine 12 is heated may be correlated with a temperature above which friction losses in the transmission 14 are greater than friction losses in the engine 12, and may be dependent upon engine load and speed.

Figure 3:
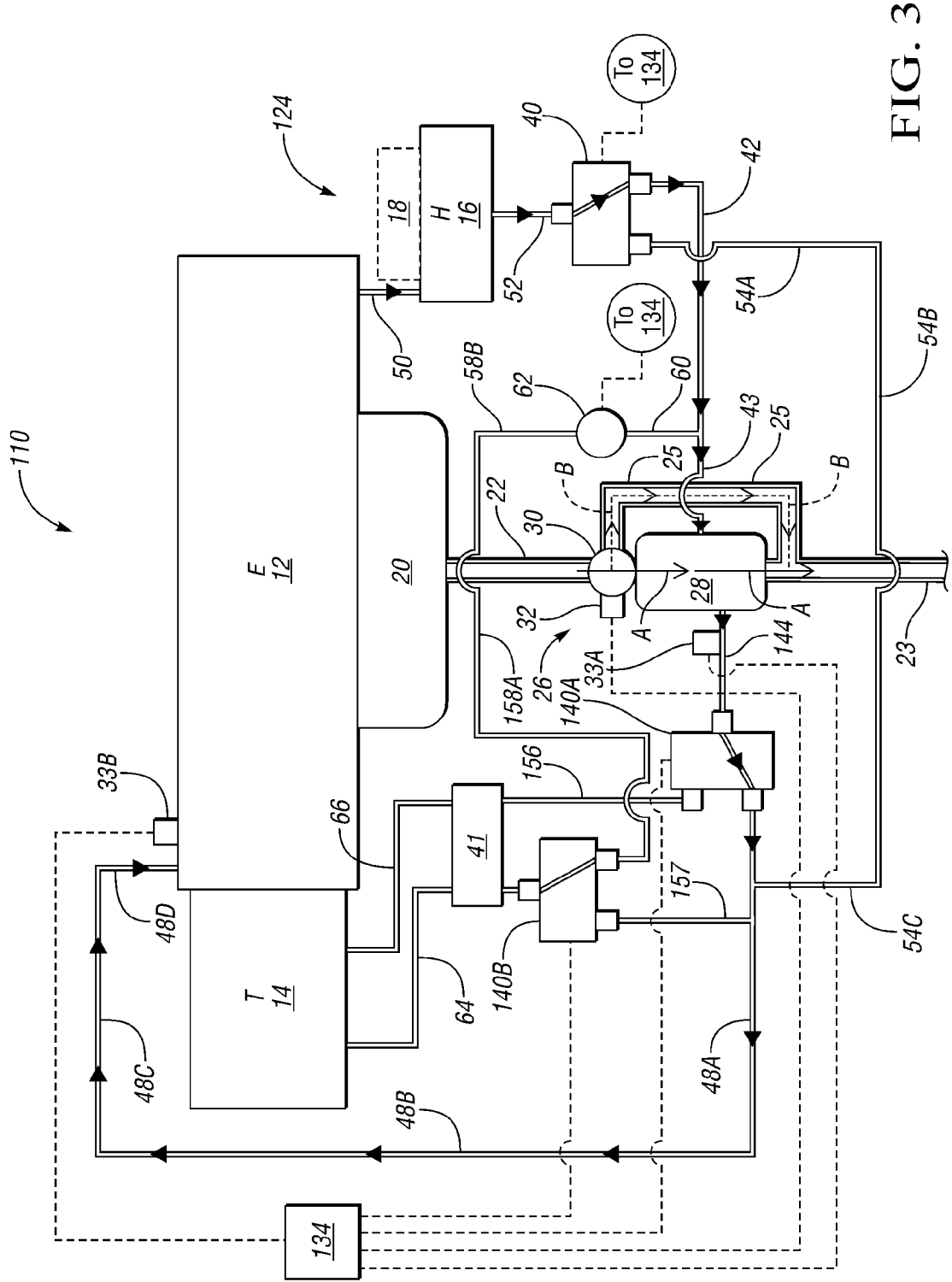
FIG. 3 is a schematic illustration of a second embodiment of a vehicle with a second embodiment of an EHRS operating in an engine warm-up mode.
Figure 4:
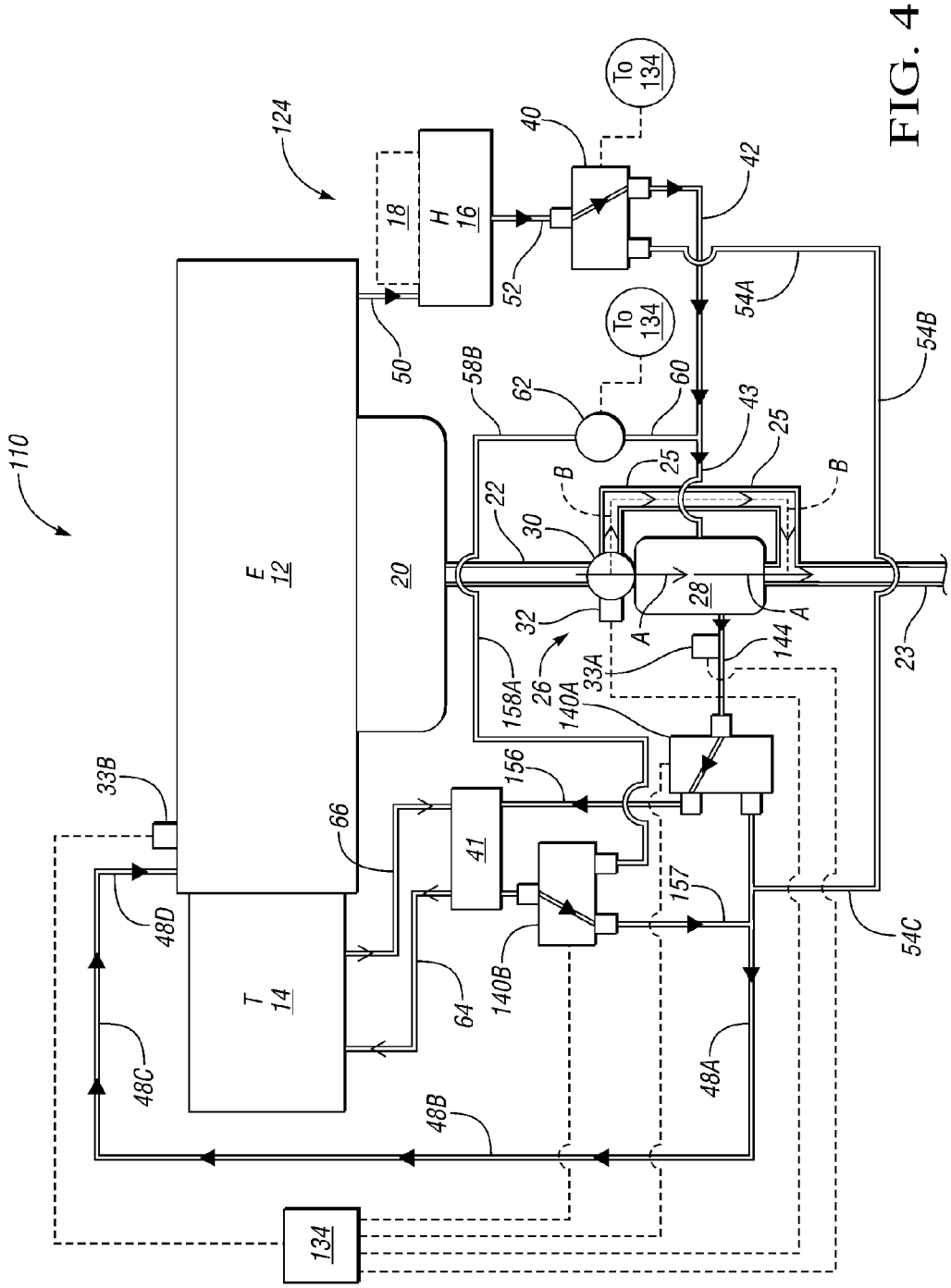
FIG. 4 is a schematic illustration of the vehicle of FIG. 3 with coolant flow heated by the EHRDHE directed to both the transmission and the engine after the engine reaches a predetermined temperature.
Figure 5:
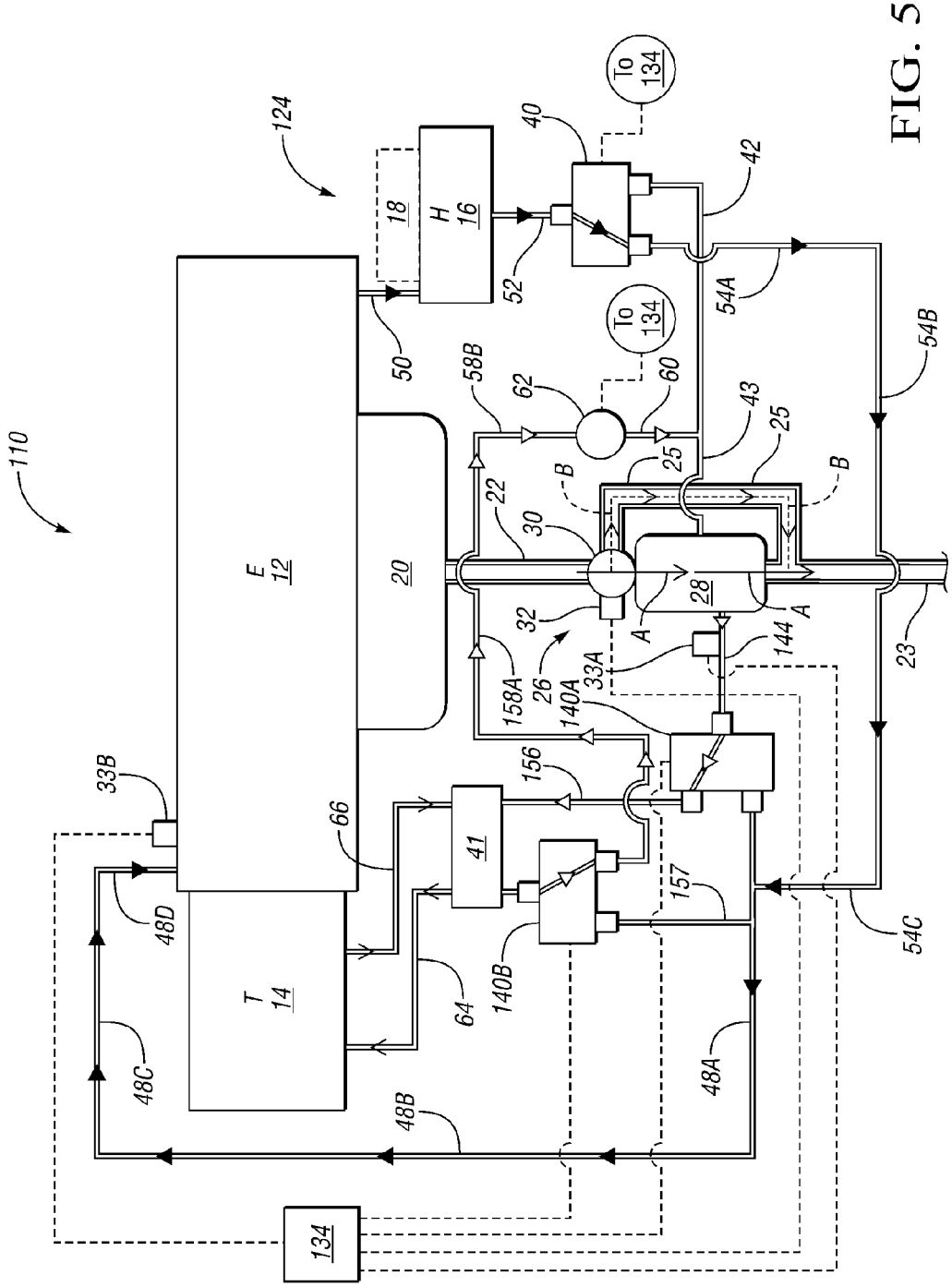
FIG. 5 is a schematic illustration of the vehicle of FIG. 3 with coolant flow heated by the EHRDHE directed to the transmission and not to the engine after the engine reaches another predetermined temperature, and with a bypass mode shown in phantom.

Referring to FIGS. 3-5, another embodiment of a vehicle 110 with another embodiment of an EHRS 124 is shown. Components that are the same as those shown and described with respect to vehicle 10 and EHRS 24 are shown with like reference numbers. In a first coolant flow circuit, coolant flows from the EHRDHE 28 to the engine 12. Specifically, coolant flows through conduit 42 from the valve 40 (which is in the first position of FIG. 3), to conduit 43 and through the EHRDHE 28, to conduit 144 extending from the EHRDHE 28, through valve 140A to conduits 48A, 48B, 48C and 48D, through coolant flow passages in the engine 12, through conduit 50 to the heater 16, and conduit 52 extending from the heater 16 to the valve 40, as indicated with solid arrowheads. The first coolant flow circuit is not in substantial fluid or thermal communication with the transmission heat exchanger 41.

A second coolant flow circuit directs coolant flow to the engine 12 and bypasses the EHRDHE 28. In the second coolant flow circuit, coolant runs through conduits 54A, 54B and 54C from the valve 40 (which is in the second position of FIG. 5), to conduits 48A, 48B, 48C and 48D, through coolant flow passages in the engine 12, through conduit 50 extending from the engine 12 to the heater 16, and conduit 52 extending from the heater 16 to the valve 40. The second coolant flow circuit is not in substantial fluid or thermal communication with the transmission heat exchanger 41.

A third coolant flow circuit directs coolant flow from the EHRDHE 28 to the transmission heat exchanger 41. In the third coolant flow circuit, coolant runs from a pump 62 through conduit 60, to conduit 43 into the EHRDHE 28, to conduit 144, through valve 140A when in the position of FIG. 5, to conduit 156, into the transmission heat exchanger 41, to conduits 158A and 58B, and back through the pump 62. The pump 62 is positioned to pump coolant through the third circuit when powered on in response to a control signal received from the controller 134. The third coolant flow circuit is not in substantial fluid or thermal communication with the engine 12.

By controlling the valve 30, valves 40, 140A, 140B, and pump 62, exhaust heat recovery is managed to heat the engine 12, heater 16, or the transmission 14 as desired in response to coolant temperatures sensed by sensors 33A and 33B. For example, an engine warm-up mode is established when the engine temperature sensor 33B indicates that coolant flow temperature through the engine 12 is less than or equal to a predetermined temperature, such as but not limited to 80 degrees Celsius. This mode may be appropriate during an engine cold start. The controller 134 sends signals to position the valve 40 in the first position of FIG. 3, position valve 140A in the position shown in FIG. 3, and to position the bypass valve 30 to permit exhaust gas flow through the EHRDHE 28 as indicated by flow arrows A. The controller 134 does not send a signal to start the pump 62 (i.e., pump 62 is off). Thus, coolant will flow through the first coolant flow circuit, with heat being transferred from the exhaust gas to the coolant via the EHRDHE 28, and transferred to the engine 12 to heat the engine 12, and then to the heater 16. Heat is not transferred to the transmission 14 during this mode.

Once the engine coolant temperature sensor 33B indicates that coolant temperature flowing through the engine 12 is greater than a predetermined temperature, such as 80 degrees Celsius, but less than another predetermined temperature, such as 90 degrees Celsius, a transmission warm-up mode is initiated, during which heated coolant is first directed to the transmission 14, and then to the engine 12 to continue heating of the engine 12 as well to heat the transmission 14. To establish the transmission warm-up mode, the controller 134 sends control signals to position the valve 40 in the first position of FIG. 4, position valve 140A in the position shown in FIG. 4, position valve 140B in the position shown in FIG. 4, and to position the bypass valve 30 to permit exhaust gas flow through the EHRDHE 28 as indicated by flow arrows A. The controller 134 does not send a signal to start the pump 62 (i.e., pump 62 is off). Thus, coolant will flow through a coolant flow circuit from the EHRDHE 28, through conduit 144, valve 140A, conduit 156, the transmission heat exchanger 41, valve 140B, conduits 157, 48A, 48B, 48C and 48D, through engine 12, conduit 50, heater 16, conduit 52, and valve 40 and conduits 42 and 43. Coolant flow in this coolant flow circuit is indicated by arrowheads. Heat is thus transferred from the exhaust gas to the coolant via the EHRDHE 28, and transferred to transmission 14 via the transmission heat exchanger 41, then to the engine 12 and the heater 16.

Once the engine 12 has been warmed to a predetermined temperature, such as 90 degrees Celsius, as indicated by the coolant temperature sensor 33B, further warming of the engine 12 is not advantageous to vehicle efficiency. However, further warming of the transmission 14, to another predetermined temperature, such as but not limited to 122 degrees Celsius, will improve vehicle performance. Accordingly, the controller 134 sends a control signal to position the valve 40 in the second position of FIG. 5 so that coolant flow through the engine 12 is through the second coolant flow circuit and is not heated via exhaust gas in the EHRDHE 28. If the EHRD coolant temperature sensor 33A indicates that coolant flowing from the EHRDHE 28 is greater than 90 degrees Celsius and less than 122 degrees Celsius, the controller 134 will maintain the bypass valve 30 in a position to direct exhaust gas through the EHRDHE 28, maintain valves 140A and 140B in the positions of FIG. 5, and turn pump 62 on so that coolant circulates through the third coolant flow circuit, drawing heat from the EHRDHE 28 which is then transferred to the transmission 14 through the transmission heat exchanger 41. Coolant flow through the third coolant flow circuit is indicated by unshaded arrowheads.

When the coolant temperature sensor 33A indicates that coolant flowing from the EHRDHE 28 is greater than a predetermined temperature, such as 122 degrees Celsius, the controller 134 will position the bypass valve 30 to direct exhaust gas from pipe 22 to pipe 25 and then to pipe 23, circumventing or bypassing the EHRDHE 28 in a bypass mode, as indicated in phantom by flow arrows B. The controller 134 will also turn pump 62 off under these conditions. Accordingly, no additional heat is transferred from the exhaust gas to the engine 12 or transmission 14.

In the embodiment of FIGS. 3-5, the temperature at which engine warm-up begins (such as 80 degrees Celsius) may be referred to as the third predetermined temperature, the temperature at which engine warm-up ends (such as 90 degrees Celsius) may be referred to as the first predetermined temperature, and the temperature at which warming of the transmission ends (such as 122 degrees Celsius) may be referred to as the second predetermined temperature.

Optionally, one or more of the valves 40, 140A, 140B may be wax motor or vacuum diaphragm-type valves, in which case they would not be activated by an actuator controlled by the controller 34. For example, valves 40, 140A, and 140B may all be wax motor valves configured to open at one or more predetermined temperatures. In one embodiment, valve 40 would start to open at 90 degrees Celsius to move from the position of FIGS. 3 and 4 to the position of FIG. 5. Valve 140B would also start to open at 90 degrees Celsius to move from the position of FIG. 4 to the position of FIG. 5, while valve 140B would start to open at 70 degrees Celsius to move from the position of FIG. 3 to the position of FIGS. 4 and 5.

Figure 6:
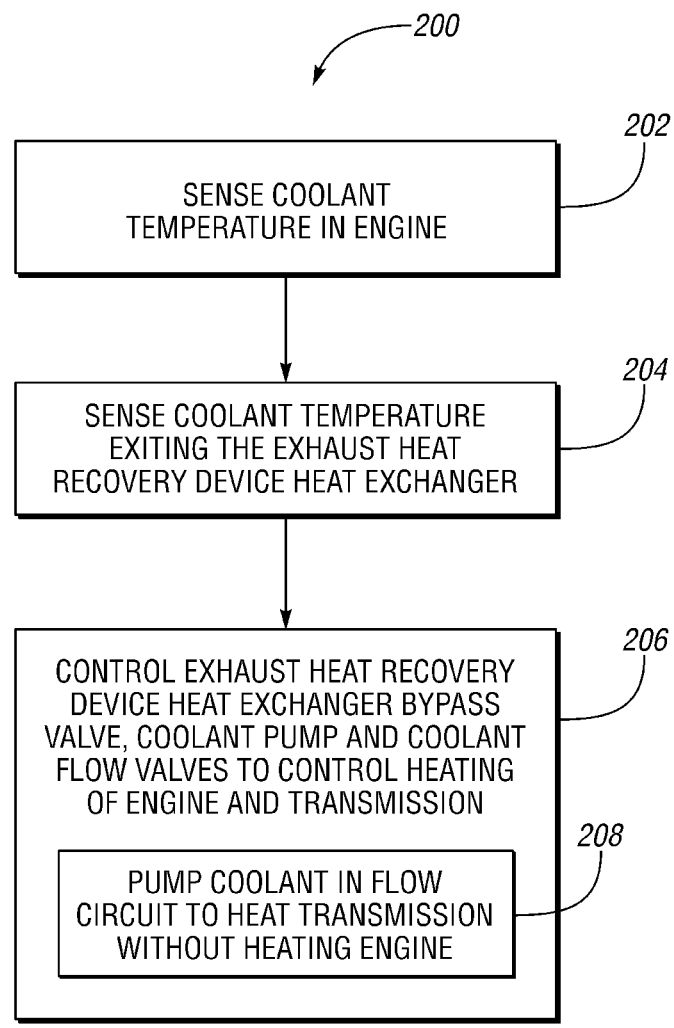
FIG. 6 is a flowchart of a method of managing exhaust heat recovery.

Referring to FIG. 6, a method of managing exhaust heat 200 is shown in a flowchart. The method 200 applies to the vehicles 10, 110 and EHRSs 24, 124 of FIGS. 1-5. The method 200 will be described with respect to the vehicle 10 and EHRS 24 of FIGS. 1-2, but is not limited to that embodiment. The method 200 includes step 202, sensing coolant temperature in the engine 12, such as by engine coolant temperature sensor 33B to control heating of the engine 12. The method 200 also includes step 204, sensing coolant temperature exiting the EHRDHE 28, such as in conduit 44. This allows the coolant temperature in the third circuit to be monitored by the controller 134, to control heating of the transmission 14.

Based on the coolant temperatures sensed in steps 202 and 204, the bypass valve 30, coolant pump 62, and coolant flow valve 40 (and valves 140A and 140B in the embodiment of FIGS. 3-5) are controlled in step 206 to determine whether exhaust heat is directed to the engine 12 and/or the transmission 14, or whether the exhaust gas bypasses the EHRDHE 28. Thus, step 206 allows the transmission 14 to be heated via the exhaust gas heat to a higher temperature than the engine 12 in substep 208 via controlling the coolant pump 62, thus increasing vehicle operating efficiency.

While the best modes for carrying out the invention have been described in detail, those familiar with the art to which this invention relates will recognize various alternative designs and embodiments for practicing the invention within the scope of the appended claims.

The invention claimed is:

1. An exhaust heat recovery system (EHRS) for a vehicle with an engine, a transmission with a transmission heat exchanger, and an exhaust system through which exhaust gas is discharged from the engine, comprising:
    an exhaust heat recovery device positioned in the exhaust system and that has an exhaust heat recovery device heat exchanger (EHRDHE) and a bypass valve operable in a first position to direct exhaust gas through the EHRDHE and in a second position to bypass the EHRDHE;
    a plurality of coolant flow passages defining a first circuit directing coolant flow from the EHRDHE to the engine, a second circuit directing coolant flow to the engine and that bypasses the EHRDHE, and a third circuit that directs coolant flow from the EHRDHE to the transmission heat exchanger and is not in fluid communication with the engine;
    a plurality of coolant temperature sensors operable to sense temperature of the coolant in the circuits;
    at least one valve operable to direct coolant flow to the first circuit when coolant temperature in the first circuit is less than a first predetermined temperature, to thereby warm the engine using the exhaust heat, and to direct coolant flow to the second circuit when coolant temperature of the engine is greater than the first predetermined temperature;
    wherein the at least one valve includes a first valve downstream of the engine and upstream of the EHRDHE and selectively operable to direct coolant flow to the first circuit and alternately to the second circuit; wherein the at least one valve includes a second valve and a third valve downstream of the EHRDHE and operable to direct coolant flow from the EHRDHE through the second valve to the transmission heat exchanger and then through the third valve to the engine when the coolant temperature downstream of the EHRDHE is greater than a third predetermined temperature and less than the first predetermined temperature;
    a pump positioned to pump coolant in the third circuit and controllable to pump the coolant when the coolant temperature in the third circuit is greater than the first predetermined temperature and less than a second predetermined temperature; wherein the second predetermined temperature is greater than the first predetermined temperature so that the transmission is warmed further by the exhaust heat after warming of the engine is complete; and
    wherein the second valve and the third valve are operable to direct coolant flow from the EHRDHE to the transmission heat exchanger and back to the EHRDHE through the third circuit without traveling through the first valve when the coolant temperature downstream of the EHRDHE is greater than the first predetermined temperature and less than the second predetermined temperature.

2. The EHRS of claim 1, wherein the first valve is one of an electric valve and a wax motor valve.

3. The EHRS of claim 1, wherein the coolant temperature sensors include an engine coolant temperature sensor operable to sense temperature of coolant flowing through the engine and an exhaust heat recovery coolant temperature sensor operable to sense temperature of coolant exiting the EHRDHE prior to flowing through either of the transmission heat exchanger and the engine.

4. The EHRS of claim 1, further comprising:
a controller operatively connected to the bypass valve, the at least one valve, the plurality of coolant temperature sensors and the pump and configured to receive information indicative of coolant temperature from the coolant temperature sensors and to control the bypass valve, the at least one valve and the pump in response to the information received.

5. An exhaust heat recovery system (EHRS) for a vehicle with an engine having a coolant flow inlet and a coolant flow outlet, a transmission with a transmission heat exchanger, and an exhaust system through which exhaust gas is discharged from the engine, comprising:
an exhaust heat recovery device positioned in the exhaust system and that has an exhaust heat recovery device heat exchanger (EHRDHE) and a bypass valve operable to selectively direct exhaust gas through the EHRDHE when in a first position and to bypass the EHRDHE when in a second position;
a plurality of coolant flow passages defining
a first coolant flow circuit in fluid communication with the EHRDHE and with the engine and not in fluid communication with the transmission heat exchanger;
a second coolant flow circuit in fluid communication with the engine and not in fluid communication with the EHRDHE; and
a third coolant flow circuit in fluid communication with the EHRDHE and with the transmission heat exchanger and not in fluid communication with the engine;
a first valve positioned downstream of the engine coolant flow outlet and selectively operable to direct coolant flow to the first circuit and alternately to the second circuit;
a first temperature sensor positioned to measure temperature of the coolant in the engine;
a second temperature sensor positioned to measure temperature of the coolant in the third circuit;
a coolant pump positioned to pump coolant in the third circuit;
wherein the first valve directs coolant flow to the first circuit when the temperature of the coolant in the engine is less than or equal to a first predetermined temperature to warm the engine and directs coolant flow to the second circuit when the temperature of coolant in the engine is greater than the first predetermined temperature;
wherein the coolant pump is on when the temperature of coolant in the engine is greater than the first predetermined temperature and temperature of coolant in the third circuit is less than a second predetermined temperature so that coolant flow in the third circuit is heated by the EHRDHE to warm the transmission; wherein the second predetermined temperature is greater than the first predetermined temperature;
wherein the bypass valve is selected so that exhaust gas bypasses the EHRDHE when the temperature of coolant in the third circuit is greater than the second predetermined temperature;
a second valve and a third valve both downstream of the EHRDHE and operable to direct coolant flow from the EHRDHE to the transmission heat exchanger and then to the engine when the coolant temperature downstream of the EHRDHE is greater than a third predetermined temperature and less than the first predetermined temperature;
wherein the second valve and the third valve are operable to direct coolant flow from the EHRDHE to the transmission heat exchanger and back to the EHRDHE through the second valve, the third valve, and the third circuit without traveling through the first valve when the coolant temperature downstream of the EHRDHE is greater than the first predetermined temperature and less than the second predetermined temperature, thereby warming the transmission further after warming of the engine is complete.

6. The EHRS of claim 5, wherein the first valve is one of an electric valve and a wax motor valve.

7. A method of managing exhaust heat recovery on a vehicle comprising:
controlling a bypass valve for an exhaust heat recovery device heat exchanger (EHRDHE), a coolant pump and one or more coolant flow valves to control heating of coolant in multiple coolant flow circuits in response to sensed coolant temperature, including
a first coolant flow circuit in fluid communication with the EHRDHE and with an engine and not in thermal communication with a transmission heat exchanger;
a second coolant flow circuit in fluid communication with the engine and not in fluid communication with the EHRDHE; and
a third coolant flow circuit in fluid communication with the EHRDHE and with the transmission heat exchanger and not in fluid communication with the engine; and
wherein the bypass valve, the coolant pump and the one or more coolant flow valves are controlled so that a transmission in fluid communication with the transmission heat exchanger is heated via exhaust heat and coolant flow in the third coolant flow circuit to a higher temperature than the engine after the engine is heated via exhaust heat and coolant flow in the first coolant flow circuit, without coolant flowing through the first valve when coolant flows through the third coolant flow circuit, and with coolant flow to the engine being via the second coolant flow circuit when the transmission is heated via coolant flow in the third coolant flow circuit.

8. The method of claim 7, further comprising:
sensing coolant temperature in the engine upstream of the one or more coolant flow valves; and
sensing coolant temperature exiting the EHRDHE.

9. The method of claim 7, further comprising:
pumping coolant in the third coolant flow circuit via the coolant pump when the transmission is heated via coolant flow in the third coolant flow circuit.

* * * * *